Figure 1:
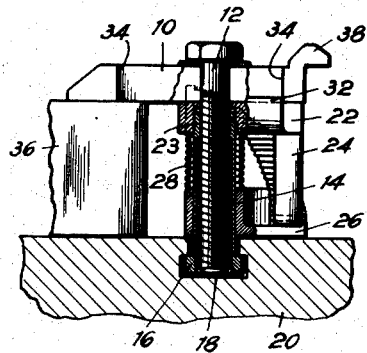

Sept. 1, 1953         K. ZWICK         2,650,523
HOLDDOWN CLAMP
Filed April 14, 1952

INVENTOR
KURT ZWICK,
by
John Q. Brady
ATTORNEY

Patented Sept. 1, 1953

2,650,523

UNITED STATES PATENT OFFICE 2,650,523

HOLDDOWN CLAMP

Kurt Zwick, Munich, Germany, assignor to Hans Deckel, Munich-Solln, and Friedrich Wilhelm Deckel, Post Tutzing, Germany Application April 14, 1952, Serial No. 282,242
In Germany April 27, 1951

5 Claims. (Cl. 90—59)

The present invention relates to a device for fastening work pieces or the like to holding elements, for example, machine tables, which comprises a double-armed clamp member, which is so tightened by means of a screw device engaging with the holding element so that it rests with one arm on an equalizer arrangement supported on the holding element, and presses the work piece with the other arm against the holding element.

Heretofore in the art, devices of this type have employed a screw arrangement consisting of a screw bolt which could either be screwed into the clamp table and pressed with its head onto the clamp member, or which could have its head engaged in a groove of the clamp table, the clamp member being tightened by means of a nut engaging the bolt. In order to obtain a wide size-range of work pieces in these arrangements the screw bolt was necessarily quite long. This is disadvantageous insofar as the fastening of low work pieces is concerned as a considerable portion of the screw bolt either projects out on the lower side of the clamp table, or extends above the device and thereby has a detrimental effect on the freedom of movement of the clamp table or the work piece holder. To avoid this disadvantage the screw bolts have to be adapted in each case as exactly as possible to the dimensions of the work pieces, which would require a large number of screw bolts of various lengths and their frequent exchange which is, therefore, unfavorable because of the demands upon material and working time.

It is the object of the present invention to avoid these disadvantages and provide a fastening device, which with the least external dimensions possesses a particularly wide tension range is operable easily and quickly and whose individual parts always form a unitary assembly.

According to the present invention this is achieved by a screw arrangement consisting of a threaded socket and a screw member that can be screwed into the socket, where the screw member is provided with threads over almost its entire length and the bore of the socket is made at least approximately as long as the threaded part of the screw member.

A particularly advantageous construction of the fastening device is achieved according to other features of the invention by arranging a clamp member on a lower part of the device which is rotatably mounted about the longitudinal axis of the screw device and which cooperates with an equalizer member formed with accurately arranged steps, the equalizer member being likewise mounted swingably about the longitudinal axis of the screw device.

The use of a stepped base for a fastening device has been known heretofore. However, in the prior devices the stepped base of fastening device was not arranged swingably about the axis of the screw device, but was loosely rotatable at one end of the clamping member so that the swivel pivot, of the base of fastening device, projected beyond the clamping member.

Such an arrangement, however, also has the aforementioned disadvantage that in order to achieve a wide clamping range the axis of rotation has to be made correspondingly long, and thus interferes with the freedom of movement of the tool carrier.

Figure 3:
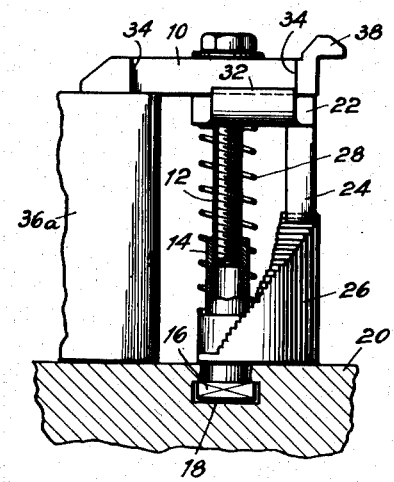
Figure 2:
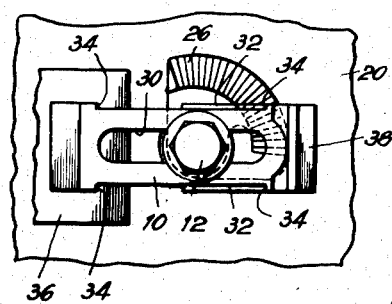
Figure 4:
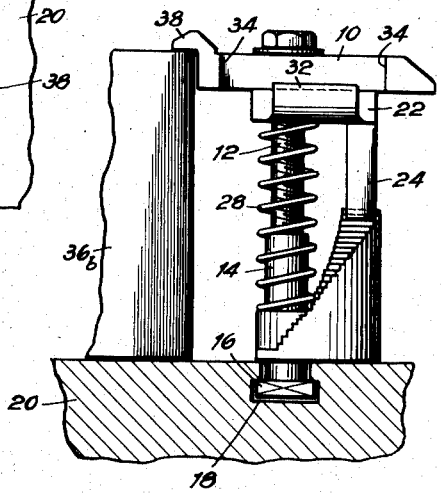

The invention will be more clearly understood from the specification hereinafter following by reference to the accompanying drawings in which:

Figure 1 is an elevational view of the device with certain of the parts broken away and shown in section; Fig. 2 is a plan view; Fig. 3 is an elevational view showing the application of the device to a work piece of large size; with certain of the parts broken away and shown in section; and Fig. 4 illustrates a modified form of the invention viewed in side elevation.

The securing device according to Figs. 1 and 2 contains a double-armed clamp member 10 which cooperates with a headed bolt 12 which engages in a screw-threaded sleeve 14. The sleeve 14 has a circular head 16 which engages a groove 18 of the stationary part 20, for example, a machine table. The bore of the sleeve 14 is at least approximately as long as the thread part of the bolt 12. An equalizer device is rotatably arranged about the longitudinal axis of the bolt 12 and sleeve 14. This consists of a lower part 22 arranged between the upper end of the sleeve 14 and the clamp member 10, in such a way that apertured part 23 surrounds the upper end of the sleeve 14. The lower part 22 has a downwardly projecting arm 24 which cooperates with a stepped equalizing member 26 which can be swivelled about the sleeve 14. A spring 28 tends to hold the lower part 22 together with the clamp member 10 against the head of the bolt 12.

The clamp member 10 is provided with a longitudinal slot 30 for the passage of the bolt 12, which makes it possible to adjust the clamp member 10 relative to the lower part 22 transversely with respect to the longitudinal axis of the bolt 12 and sleeve 14. This freedom of movement for adjustment is limited by two upwardly extending lugs 32 on the lower part 22 which cooperate with corresponding abutments 34 of the clamp member 10.

In fastening a work piece 36 lying on the machine table 20, the equalizer arrangement comprising parts 22, 24 and 26 is to be adjusted to a level corresponding to the height of the work piece and the screw device has to be operated by tightening the bolt 12, until the work piece 36 is tightly clamped by the free arm of the clamp member 10.

Fig. 1 shows the fastening or securing device in a position which corresponds to the smallest work piece level that can be clamped. In Fig. 3, on the other hand, the device is represented in securing a work piece 36a which is almost twice the height of the work piece 36 in Fig. 1. The clamping range of the fastening device can, however, be enlarged still further if, according to Fig. 4, the end of clamp member 10 is offset as shown at 38 to engage and fasten the work piece 36b. In this case the constructional height of the device is only slightly larger than the height of the work piece itself.

Finally, it should also be mentioned that the individual parts of the device form a unitary assembly as a result of their advantageous formation and arrangement, through which a rapid and easy operation is rendered possible.

While certain preferred embodiments of the invention have been shown it is realized that further modifications and changes may be made and it is desired that it be understood that no limitations upon the invention are intended other than may be imposed by the scope of the appended claims.

What I claim as new and desire to secure by Letters Patent of the United States is as follows:

1. A clamping device as set forth in claim 5, in which a clamp is rotatable around the longitudinal axis of the screw device and cooperates with said equalizer member which is also rotatable around the longitudinal axis of the screw device, and wherein a spring is disposed around the longitudinal axis of the screw device which presses the clamp against the head of the bolt.

2. A clamping device as set forth in claim 5, which includes a clamp member having at least two abutment surfaces and a lower part coacting with said clamp member, said lower part having corresponding countersurfaces which limit the transverse adjustment of the clamp member, and wherein said lower part has an apertured portion into which the threaded sleeve partly penetrates.

3. A clamping device as set forth in claim 5, in which the threaded sleeve is provided at its lower end with a head by means of which it can be inserted in correspondingly shaped grooves of a holding part.

4. A clamping device for securing work pieces on a work table, comprising a work table, a stepped equalizing member supported on the work table adjacent a work piece, a screw device disposed between the work piece and the stepped equalizing member, said screw device including a sleeve having an internally screw-threaded bore and a head thereon for engaging said sleeve in the work table, a screw-threaded headed bolt extending into the screw-threaded bore of said sleeve, a clamp member engaged by said headed bolt, a lower part engaged by said bolt beneath said clamp member, said lower part having a projection depending therefrom and adjustably engaging said stepped equalizing member, said clamp member having one end thereof in engagement with the work piece and the other end in engagement with said lower part and over the depending projection thereof and a compression coil spring concentrically surrounding said screw device and interposed in tension between the base of said stepped equalizing member and the lower surface of said lower part, whereby said headed bolt when adjustably engaged in the screw-threaded bore of said sleeve operates to secure said elements together in a unitary assembly.

5. A clamping device for securing work pieces or the like on holding elements such as machine tables which comprises a double-armed clamp, a holding element, an equalizer arrangement supported on the holding element, a screw device engaging said clamp and said holding element so that said clamp rests with one arm on said equalizer arrangement and the other arm supported on the work piece, said screw arrangement consisting of a threaded socket and a screw member adjustably engaging said socket, said screw member being provided with threads over substantially its entire length and the bore of the socket being at least approximately as long as the threaded part of the screw member, said clamp member being adjustable transversely with respect to the longitudinal axis of the screw member and a sleeve rotatably mounted about the longitudinal axis of the screw member and connected with said holding element and a downwardly projecting arm on said clamp engageable with said equalizing member, said equalizing member being swivelly mounted about said sleeve.

KURT ZWICK.

References Cited in the file of this patent

UNITED STATES PATENTS

| Number | Name | Date |
|---|---|---|
| 1,685,899 | Andrew | Oct. 2, 1928 |
| 1,801,222 | Cayo | Apr. 14, 1931 |

FOREIGN PATENTS

| Number | Country | Date |
|---|---|---|
| 236,421 | Germany | Dec. 9, 1909 |
| 571,234 | France | Jan. 30, 1924 |
| 898,683 | France | July 10, 1944 |